W. WELLS.
CHAIN TIGHTENER, FASTENER, AND LOCK.
APPLICATION FILED MAY 28, 1917.

1,262,147.

Patented Apr. 9, 1918.

Inventor:
William Wells

UNITED STATES PATENT OFFICE.

WILLIAM WELLS, OF VALE, OREGON.

CHAIN TIGHTENER, FASTENER, AND LOCK.

1,262,147.  Specification of Letters Patent.  Patented Apr. 9, 1918.

Application filed May 28, 1917. Serial No. 171,364.

*To all whom it may concern:*

Be it known that I, WILLIAM WELLS, a citizen of the United States, residing at Vale, in the county of Malheur and State of Oregon, have invented a new and useful Chain Tightener, Fastener, and Lock, of which the following is a specification, reference being had to the accompanying drawing.

My invention relates to a chain tightener, fastener, and lock for use particularly in connection with a Weed or other automobile tire chain, although other uses may be made of same. The device may be used solely as a chain tightener auxiliary to the chain, in which instance the original locking device may be retained, or it may be used as an integral part of the chain thereby dispensing with the previous or other locking device.

The object of the invention is to provide a device of this character which will be simple, inexpensive, strong and durable in construction, which may be conveniently applied and operated, and which when shut will be automatically locked.

By attaching the device to an automobile tire chain, the chain can be quickly and easily tightened and fastened, thereby eliminating the loss in power due to loose chains, stabilizing the pull on the chain, and reducing the number of blow outs, as well as lessening the dangers of automobile use on slippery roads and streets.

With the above and other uses in view, the invention consists in the novel construction, combination, and arrangement of parts hereinafter described, and claimed, and, illustrated in the accompanying drawing, in which:

Figure 2:
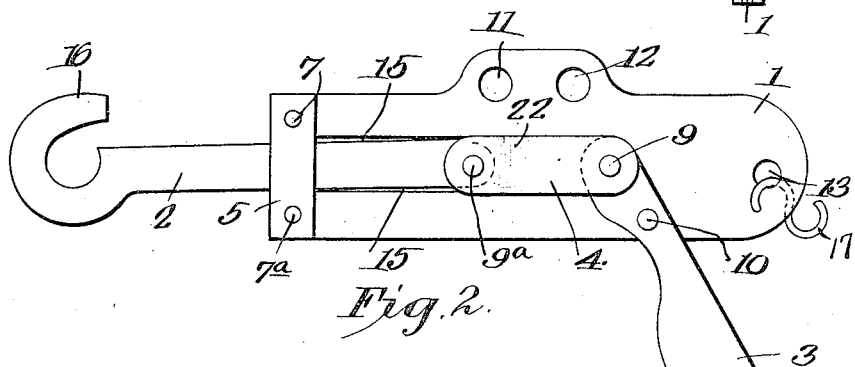
Fig. 2 is perspective view of the device opened.

Referring to the drawing, wherein the same reference characters refer to the same element throughout the several views, my chain tightener, fastener, and lock consists of the following: A frame 1, Fig. 2, provided with a slot 15, and carrying two cross arms 5, Fig. 2, and 6, Fig. 3, rigidly fastened to frame 1 by means of rivets or bolts 7 and $7^a$, or otherwise attached thereto. An operating lever 3, Fig. 2, will catch or latch 8 as a part thereof, provided at one end, said lever being movably mounted to frame 1 by rivet or bolt 10, and also movably mounted to connecting lever 4 by rivet or bolt 9 near the other end. A connecting lever 4, slightly bent outward at 22 to make room for movably attaching operating lever 3, is movably mounted near one end by means of rivet or bolt 9 to lever 3, and similarly attached near the other end by rivet or bolt $9^a$ to lever 2. Rivet or bolt $9^a$ carries mounted thereon a washer 14, Fig. 3, large enough to permit its edges to overlap slot 15 thereby preventing motion of levers 2 and 4 other than forward and backward along slot 15. A plunger lever 2 provided with hook 16 as a part thereof is movably mounted to connecting lever 4 by rivet or bolt $9^a$, and operates backward and forward through slot 15 and between cross arms 5 and 6.

Figure 1:
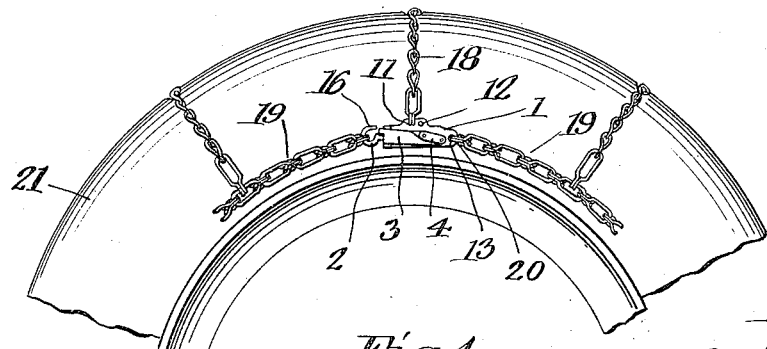
Figure 1 is a perspective view of the chain tightener, fastener, and lock attached to an automobile tire chain in a closed position.

When the device is used as a permanent and integral part of the chain as illustrated in Fig. 1, one or more holes 11 and 12 are provided in frame 1 near the top thereof to permit engagement by a chain link or other means with cross chain 18, Fig. 1. A hole is also provided near end of frame 1 at 13, Fig. 2, in order to permit connection with side chain 19. Fig. 1, by a chain link 20, or other appropriate means, as illustrated in Fig. 1, whenever the device is used as a permanent part of the chain.

Figure 4:
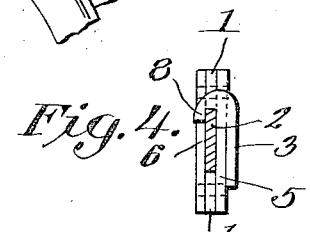
Fig. 4 is a cross section view on line A—A, Fig. 3.

While the free ends of levers 2 and 3 may be provided with any suitable means for engagement, I preferably provide them with the hook 16 and catch or latch 8 as illustrated in Figs. 2 and 4 respectively.

Figure 3:
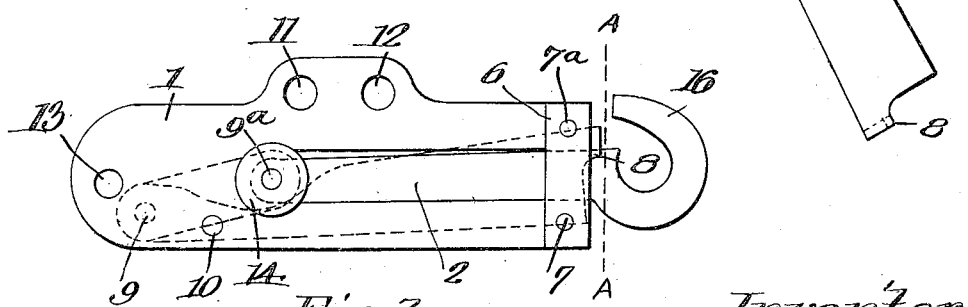
Fig. 3 is a reversed view of the same in its locked position.

In actual use, to operate as a permanent part of the chain as a tightener, fastener, and lock, the device is made a part of the chain by coupling or otherwise connecting a link or links of the cross chain 18, Fig. 1, through one or both of holes 11 and 12 provided near top of frame 1, and in the same manner coupling a link of side chain 19, Fig. 1, with frame 1 through hole 13. Or in case of a tire chain containing a different locking device, the old locking device should be removed, together with a piece of the side chain 19 the length of my device, and both the cross and side chains 18 and 19 respectively should be attached in the manner above described. The tire chain is placed around the automobile tire 21 in the usual manner and operating lever 3 thrown back toward hole 13, which operation will result in advancing plunger lever 2, after which hook 16 is engaged with a link on opposite end of side chain 19, and operating lever 3 is carried forward and across plunger lever 2 until the catch or latch 8 falls automatically over plunger lever 2 as illustrated in Figs. 3 and 4. Owing to the arrangement of parts and connecting means, it will be seen that a large part of the strain falls away from operating lever 3 when locked, so that it is an easy matter to unlatch said lever when desired by lifting operating lever 3 up and away from plunger lever 2.

In operation as a tightener auxiliary to the chain, a connecting hook 17, Fig. 2 is required of any suitable character and size to permit engagement thereby of frame 1 through hole 13 and through one end link, or other link of side chain 19, after which hook 16 is engaged to the opposite end link, or other link of side chain 19, and operated as before described, thereby tightening the whole chain, then the chain is locked with the original locking or fastening device, and the hook and tightener is removed after raising operating lever 3 as before described.

The device may be made of any suitable material, but lever 3 is made preferably of spring steel, and the rivets or bolts of copper. The weight and size of the materials will depend upon the weight and character of the chain and motor vehicle upon which used.

Various changes within the scope of the invention as defined in the following claims may be made in the particular construction of the device and also in the shape and organization of the active members of the device without departing from the spirit of the invention.

It will be noted that the device is exceedingly simple and inexpensive in construction, that it is strong and durable in use and exceptionally convenient in operation.

Having thus fully described my invention, what I claim and desire to secure by Letters Patent is:

1. A device of the character described, comprising a frame, provided with a slot, carrying an operating lever having one end with catch offset therefrom, a plunger lever provided with a hook at one end, movable means for connecting said operating and plunger levers, and means for movably connecting said operating lever with said frame, substantially as described.

2. A chain tightener, comprising a frame, provided with a slot, with hole near one end of frame, and opposite end carrying two rigidly attached cross members, an operating lever having one end with catch offset therefrom, a plunger lever provided with a hook, a movable lever connecting said operating and plunger levers, pivotal movable means for connecting said levers, and means for pivotally connecting the operating lever with frame, substantially as described.

3. A device of the character described, in combination with an automobile tire chain, a frame, provided with a slot, a plurality of holes near the top and a hole near one end of the frame, the opposite end carrying two rigidly attached cross members, an operating lever having one end with catch offset therefrom, a plunger lever provided with hook, a lever pivotally connected with said operating and plunger levers, means for opposing motion of said lever otherwise than back and forth in said slot, means for pivotally connecting said operating lever and said frame, and means for attaching said frame with a tire chain of an automobile, substantially as described.

4. In combination with an automobile tire chain, a tightener, comprising a frame, provided with a slot, with a hole near one end of said frame, and the opposite end carrying two cross members, an operating lever having one end with catch offset therefrom, a plunger lever provided with a hook at one end, a movable lever pivotally connected with said operating and plunger levers, means for opposing motion of said lever otherwise than back and forth in said slot, means for pivotally connecting said operating lever and said frame, and means for attaching said frame with the tire chain of an automobile, substantially as described.

WILLIAM WELLS.

Copies of this patent may be obtained for five cents each, by addressing the "Commissioner of Patents, Washington, D. C."